United States Patent [19]

Meininger et al.

[11] Patent Number: 4,939,243
[45] Date of Patent: Jul. 3, 1990

[54] WATER-SOLUBLE COPPER COMPLEX DISAZO COMPOUNDS CONTAING A CHLORO TRIAZINYLAMINO GROUP AND A GROUP OF THE VINYLSULFONE SERIES AS FIBER-REACTIVE GROUPS AND THEIR DYESTUFFS

[75] Inventors: Fritz Meininger; Ernst Hoyer, both of Frankfurt am Main, Fed. Rep. of Germany

[73] Assignee: Hoechst Aktiengesellschaft, Frankfurt am Main, Fed. Rep. of Germany

[21] Appl. No.: 702,687

[22] Filed: Feb. 20, 1985

Related U.S. Application Data

[63] Continuation of Ser. No. 630,347, Jul. 13, 1984, abandoned, which is a continuation of Ser. No. 456,826, Jan. 10, 1983, abandoned.

[30] Foreign Application Priority Data

Jan. 23, 1982 [DE] Fed. Rep. of Germany ....... 3202120

[51] Int. Cl.[5] .................... C09B 62/09; C09B 62/513; D06P 1/382; D06P 1/384
[52] U.S. Cl. ................................. 534/625; 534/617; 534/629; 534/642
[58] Field of Search .................. 534/625, 631, 642

[56] References Cited

FOREIGN PATENT DOCUMENTS 0040806 12/1981 European Pat. Off. ............ 534/625

Primary Examiner—Floyd D. Higel

[57] ABSTRACT

Water-soluble copper complex disazo compounds with fiber-reactive dyestuff properties of the general formula

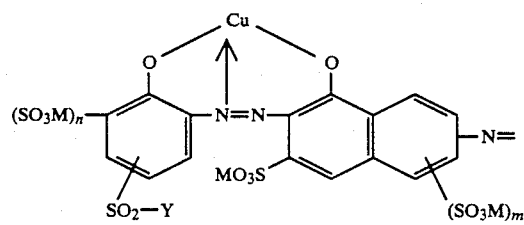

-continued

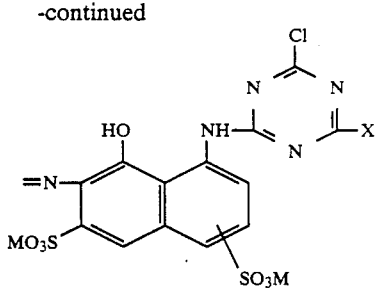

in which
m and n are the number zero or 1;
the group —SO$_2$Y is bonded in the 5-position to the benzene nucleus if n is zero, or in the 4-position if n is zero or 1;
the free azo can be bonded to the 6'-or 7'-position of the central naphthalene nucleus;
if m is 1, this sulfo is bonded in the 5'-position if the azo is in the 6'-position, and is bonded in the 6'-position if the azo is in the 7'-position;
X is chlorine, bromine,

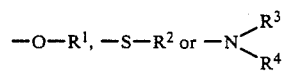

in which
R$^1$ represents optionally substituted alkyl with 1 to 4 carbon atoms, optionally substituted aryl or hydrogen,
R$^2$ is optionally substituted alkyl with 1 to 4 carbon atoms or optionally substituted aryl,
R$^3$ is hydrogen or optionally substituted alkyl with 1 to 4 carbon atoms and
R$^4$ is hydrogen, cycloalkyl which is optionally substituted by 1 to 3 methyl, optionally substituted alkyl with 1 to 4 carbon atoms or optionally substituted aryl, or
R$^3$ and R$^4$, as alkylene radicals with 1 to 4 carbon atoms together with the nitrogen atom and optionally an oxygen, sulfur or nitrogen atom as a further heteroatom, form a heterocyclic six-membered radical;
Y is vinyl or of the formula

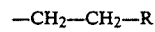

in which
R is a radical which can be eliminated under alkaline conditions; and
M is hydrogen or the equivalent of a metal.

11 Claims, No Drawings

WATER-SOLUBLE COPPER COMPLEX DISAZO COMPOUNDS CONTAING A CHLORO TRIAZINYLAMINO GROUP AND A GROUP OF THE VINYLSULFONE SERIES AS FIBER-REACTIVE GROUPS AND THEIR DYESTUFFS

CROSS REFERENCE TO RELATED APPLICATIONS

This application is a continuation of co-pending application Ser. No. 630,347, filed July 13, 1984, now abandoned, which was a continuation of application Ser. No. 456,825 filed Jan. 10, 1983, now abandoned.

The invention relates to the technical field of fiber-reactive copper complex disazo dyestuffs.

The European Patent Application with Publication No. 0,040,806 discloses fiber-reactive copper complex disazo compounds having a β-sulfatoethylsulfonyl group and a sulfophenylaminofluorotriazinylamino group.

New, valuable and advantageous water-soluble copper complex disazo compounds have now been found, which have the general formula (1)

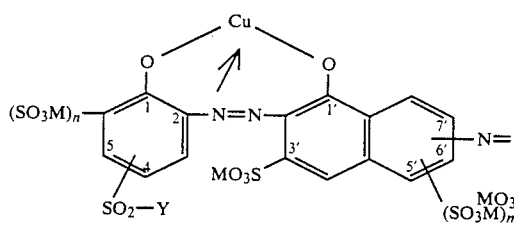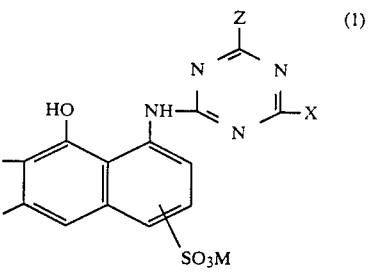

In this formula:

m is the number zero or 1 (and if m is 0, this group is hydrogen);

n is the number zero or 1 (and if n is 0, this group is hydrogen);

the group —SO$_2$—Y is bonded in the 5-position to the benzene nucleus if n is 0, or is bonded in the 4-position to the benzene nucleus if n is zero or 1;

the free azo group can be bonded in the 6'- or 7'-position to the middle naphthalene nucleus;

if m is 1, this sulfo group is bonded in the 5'-position, if the azo group is in the 6'-position, and is bonded in the 6'-position if the azo group is in the 7'-position;

X is a chlorine atom or a bromine atom, or a group of the formula (2a), (2b) or (2c)

in which

R$^1$ denotes a straight-chain or branched alkyl group which has 1 to 4 carbon atoms and can be substituted, or an optionally substituted aryl radical, or represents a hydrogen atom, R$^2$ denotes a straight-chain or branched alkyl group which has 1 to 4 carbon atoms and can be substituted, or represents an optionally substituted aryl radical, R$^3$ is a hydrogen atom or denotes a straight-chain or branched alkyl group which has 1 to 4 carbon atoms and can be substituted, preferably by a hydroxy, sulfato, sulfo or carboxy group or an alkoxy group with 1 to 4 carbon atoms, and R$^4$ is a hydrogen atom or represents a cycloalkyl group, such as a cyclopentyl or cyclohexyl group, which can be substituted by 1 to 3 methyl groups, or denotes a straight-chain or branched alkyl group which has 1 to 4 carbon atoms and can be substituted, preferably by a hydroxy, sulfato, sulfo or carboxy group or an alkoxy group with 1 to 4 carbon atoms, or is an aryl radical, which can be substituted, preferably by 1, 2 or 3 substituents selected from the following group: 3 alkyl groups with 1 to 4 carbon atoms, 2 alkoxy groups with 1 to 4 carbon atoms, 2 chlorine atoms, 3 sulfo groups, 1 carboxy group and 1 group of the formula —SO$_2$—Y defined below, and wherein R$^3$ and R$^4$ can be identical or different, or R$^3$ and R$^4$, as alkylene radicals with 1 to 4 carbon atoms, together with the nitrogen atom and optionally an oxygen, sulfur or nitrogen atom as a further heteroatom, form a heterocyclic 6-membered radical, such as, for example, the morpholine, thiomorpholine, piperazine or piperidine radical;

Y is the vinyl group or a group of the general formula (2d)

in which

R denotes an inorganic or organic radical which can be eliminated under alkaline conditions;

Z is a chlorine or bromine atom (and Z and X can have identical or different meanings); and M is a hydrogen atom or the equivalent of a metal, preferably of a monovalent or divalent metal, such as of an alkali metal or alkaline earth metal, in particular sodium, potassium or the equivalent of calcium.

Preferred alkyl groups with 1 to 4 carbon atoms are the methyl and ethyl group; preferred alkoxy groups with 1 to 4 carbon atoms are the methoxy and ethoxy group. Examples of substituted alkyl groups are alkyl groups which have 1 to 4 carbon atoms and are substituted by one or two substituents from the group comprising acetylamino, hydroxy, sulfato, β-sulfatoethylsulfonyl, vinylsulfonyl, β-thiosulfatoethylsulfonyl, alkoxy with 1 to 4 carbon atoms, sulfo, carboxy, phenyl, naphthyl, phenyl which is substituted by sulfo, carboxy, β-sulfatoethylsulfonyl, vinylsulfonyl, β-thiosulfatoethylsulfonyl, alkyl with 1 to 4 carbon atoms, alkoxy with 1 to 4 carbon atoms, chlorine, sulfamoyl and/or carbamoyl, and naphthyl which is substituted by sulfo, carboxy, β-sulfatoethylsulfonyl, vinylsulfony, β-thiosulfatoethylsulfonyl, alkoxy with 1 to 4 carbon atoms, alkyl with 1 to 4 carbon atoms, chlorine, sulfamoyl and/or carbamoyl. Preferred aryl radicals are the phenyl and naphthyl radicals; these can be substituted, for example, by substituents from the group comprising carboxy, sulfo, alkyl with 1 to 4 carbon atoms, alkoxy with 1 to 4 carbon atoms, hydroxy, chlorine, β-sulfatoethylsulfonyl, vinylsulfonyl, β-thiosulfatoethylsulfonyl, alkanoylamino with 1 to 4 carbon atoms in the alkyl radical and carbalkoxy with 1 to 4 carbon atoms in the alkyl radical.

The group R which can be eliminated under alkaline conditions is preferably a chlorine atom, the acetoxy group, a phosphato group (corresponding to the general formula $-OPO_3M_2$, where M has the abovementioned meaning), a thiosulfato group (corresponding to the general formula $-S-SO_3M$, where M has the abovementioned meaning) and, preferably, a sulfato group (corresponding to the general formula $-OSO_3M$, where M has the abovementioned meaning).

The copper complex disazo compounds according to the invention can be in the form of their free acid or, preferably, in the form of their salts, in particular neutral salts; salts which may be mentioned in particular are the alkali metal and alkaline earth metal salts, thus, for example, the sodium, potassium and calcium salts. The new compounds are preferably in the form of these salts when used for dyeing (in the general sense and including printing) material containing hydroxy groups and/or carboxamide groups.

Examples of preferred radicals $R^1$ and $R^2$ are the methyl, ethyl, propyl, isopropyl, β-hydroxyethyl, β-methoxyethyl and β-ethoxyethyl groups and the phenyl, 4-chlorophenyl, 4-methoxyphenyl and 4-sulfophenyl radicals.

Examples of amino groups of the general formula (2c) are the amino, methylamino, ethylamino, propylamino, isopropylamino, butylamino, β-methoxyethylamino, dimethylamino, diethylamino, N-β-sulfoethyl-N-methylamino, β-hydroxyethylamino, β-sulfatoethylamino, cyclohexylamino, morpholino, piperidino and piperazino groups, and above all amino groups with an optionally substituted aryl radical, such as, for example, the phenylamino, N-methyl-N-phenylamino, toluidino, xylidino, chloroanilino, anisidino, phenetidino, sulfoanilino, 3-(β-sulfatoethylsulfonyl)-anilino, 4-(β-sulfatoethylsulfonyl)-anilino, disulfoanilino, sulfomethylanilino, N-sulfomethyl-anilino, N-methyl-sulfoaniline, carboxyphenylamino, 2-carboxy-5-sulfophenylamino and 2-carboxy-4-sulfophenylamino groups, and sulfonaphthylamino groups, such as the 4-sulfonaphth-1-ylamino, 3,6-disulfonaphth-1-ylamino and 3,6,8-trisulfonaphth-1-ylamino groups.

The present invention furthermore relates to processes for the preparation of these copper complex disazo compounds according to the invention. These processes comprise (a) diazotizing a copper complex monoazo compound of the general formula (3)

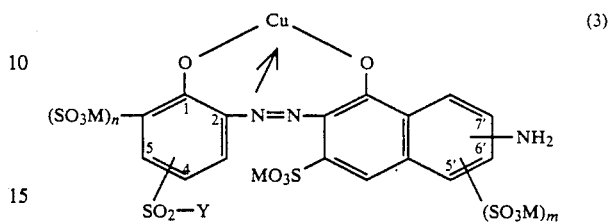

(in which m, n, Y and M have the abovementioned meanings and the free amino group is bonded in the 6'- or 7'-position to the naphthalene nucleus, and, if m is 1, this sulfo group is bonded in the 5'-position to the naphthalene nucleus if the amino group is in the 6'-position, and the sulfo group is bonded in the 6'-position to the naphthalene nucleus if the amino group is in the 7'-position) and coupling the diazotization product with a compound of the general formula (4)

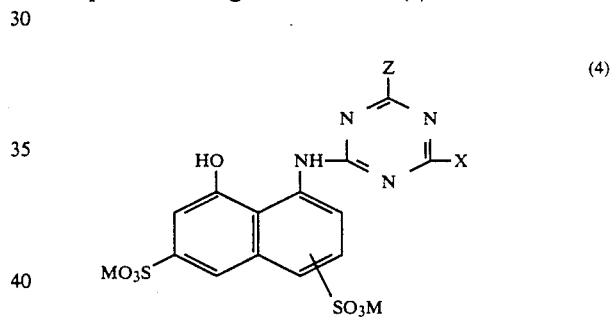

(in which M, X and Z have the abovementioned meanings), or (b) diazotizing an o,o'-dihydroxy-azo compound of the general formula (5)

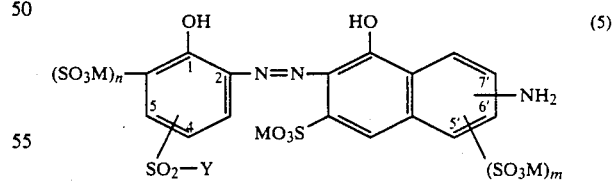

(in which M, Y, m and n have the meanings given in the case of formula (1) or formula (3)), coupling the diazotization product with a compound of the general formula (4) mentioned above and defined, and then treating this metal-free disazo compound with an agent which donates copper, or (c) reacting a disazo compound of the general formula (6)

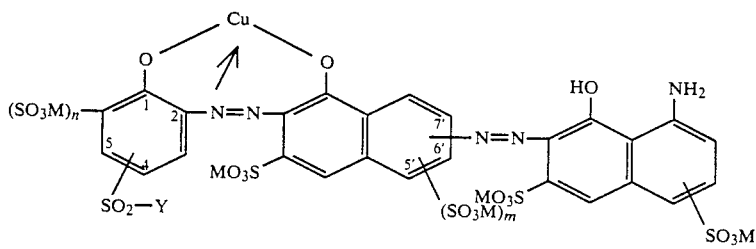

(in which M, Y, m and n have the abovementioned meanings) with a dihalogeno-s-triazine compound of the general formula (7)

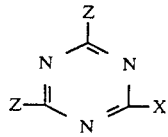

(in which X is a group of the formula (2a), (2b) or (2c) mentioned above and defined, and the two radicals Z have the same, abovementioned meaning), for example at a temperature between 25° and 60° C., preferably between 30° and 50° C., and at a pH value between 4.5 and 6.5, preferably between 5 and 6, or with cyanuric chloride or cyanuric bromide, for example at a temperature between −10° C. and 25° C., preferably between 0° and 15° C., and at a pH value between 1 and 3.5, preferably between 2 and 3, in an aqueous-organic, preferably aqueous, medium, or (d) treating a metal-free disazo compound of the general formula (8)

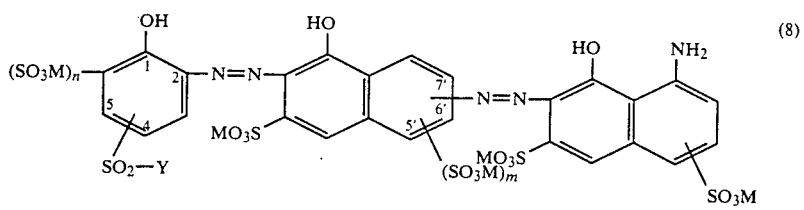

(in which M, Y, m and n have the abovementioned meanings) with a dihalogeno-s-triazine compound of the general formula (7) mentioned above and defined, for example at a temperature between 25° and 60° C., preferably between 30° and 50° C., and at a pH value between 4.5 and 6.5, preferably between 5 and 6, or with cyanuric chloride or cyanuric bromide, for example at a temperature between −10° C. and 25° C., preferably between 0° and 15° C., and at a pH value between 1 and 3.5, preferably between 2 and 3, in an aqueous-organic, preferably aqueous, medium, and then treating the product with an agent which donates copper, or (e) coupling an azo compound of the general formula (9)

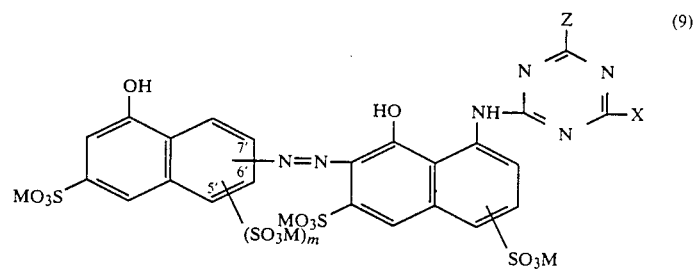

(in which M, m, X and Z have the abovementioned meanings) with the diazonium compound of an aminophenol of the general formula (10)

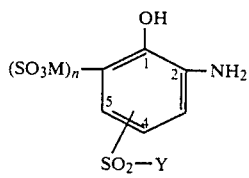

(in which Y and n have the abovementioned meanings and the group $-SO_2-Y$ is in the 4- or 5-position if n is zero and is in the 4-position if n is 1) and treating the disazo compound with an agent which donates copper, or (f) reacting a copper complex disazo compound of the general formula (11)

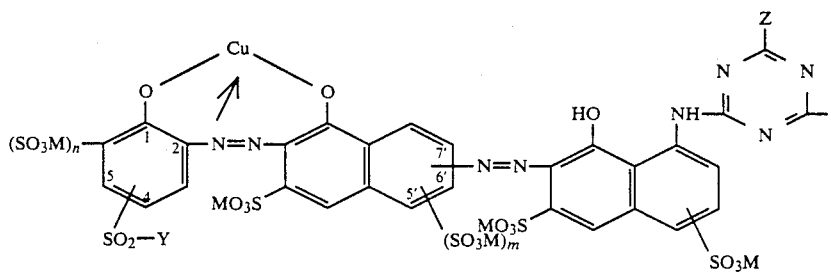

(in which M, m, n, Y and Z have the abovementioned meanings and X represents a chlorine atom or a bromine atom, it being possible to prepare this compound, for example, by variants (a) to (e) according to the invention, which are described above, or by variant (g) described below) with a compound of the general formula (12)

H—X   (12)

(in which X is a group of the above formula (2a), (2b) or (2c)), for example at a temperature between 25° and 60° C., preferably between 30° and 50° C., and at a pH value between 4.5 and 6.5, preferably between 5 and 6, or (g) treating a metal-free o,o'-dihydroxy-disazo compound of the general formula (13)

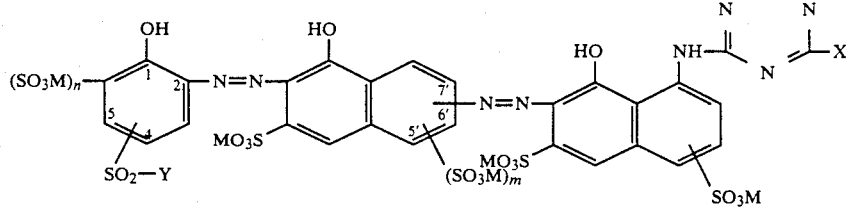

(in which M, m, n, Y, X and Z have the abovementioned meanings) with an agent which donates copper.

With respect to their process conditions, the reactions according to the invention can be carried out by procedures analogous to known procedures. Such procedures for diazotization and coupling and for the reaction of amino compounds with halogenotriazine compounds are generally known; for the latter condensation reaction, reference may in particular be made to, for ex., the European Patent Applications with Publication Nos. 0,032,187 and 0,036,133. Formation of the copper complex of the metal-free o,o'-dihydroxy-azo compounds by reaction with an agent which donates copper is likewise carried out by procedures which are known per se; these are described, for example, in German Auslegeschriften Nos. 1,544,541 and 1,644,155.

Thus, the abovementioned diazotization reactions can be carried out, for example, in aqueous solution at a temperature between −5° C. and +10° C., in particular between 0° and 5° C., by means of sodium nitrite and a mineral acid. The abovementioned coupling reactions can likewise be carried out in aqueous solution, a pH value of between 4.5 and 6.8, in particular between 5.5 and 6.5, and a temperature of between 0° and 20° C., preferably between 5° and 10° C., preferably being maintained.

The coppering reactions can likewise be carried out in an aqueous medium; in this case, the reaction is carried out, for example, at a temperature between 10° and 60° C., preferably between 15° and 40° C., and at a pH value between 4 and 5.5, preferably between 4.5 and 5.

Examples of agents which donate copper are salts of divalent copper, such as copper sulfate, copper chloride, copper acetate and copper carbonate.

The starting compounds of the general formula (4) can be prepared, for example, by procedures analogous to the procedures in German Patent Specification No. 485,185 or the European Publications mentioned above. The starting compounds of the general formula (6) can be synthesized, for example, in accordance with the procedures of German Offenlegungsschrift No. 1,544,541. The metal-free disazo compounds of the general formula (13) can be prepared from the metal-free disazo compounds of the general formula (8) by reaction with a dihalogeno-triazine compound of the abovementioned general formula (7) or by reaction of a metal-free disazo compound of the above general formula (8) with cyanuric chloride or cyanuric bromide, and a subsequent second condensation reaction with a compound of the abovementioned general formula (12), or they can be obtained by process variant (b) according to the invention. The monoazo compound of the general formula (9) used as the starting compound can be prepared, for example, by coupling the diazonium compound of aminonaphtholsulfonic acid of the general formula (14)

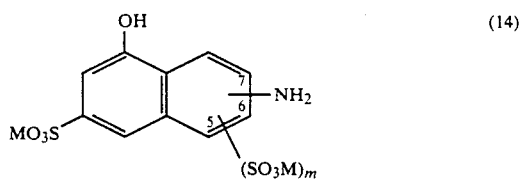

(in which M and m have the abovementioned meanings and the positions of the sulfo group and amino group are as defined for formula (5)) with a compound of the general formula (4) mentioned above and defined.

Examples of aminophenols of the general formula (10) which can be used as starting compounds for the preparation of the copper complex disazo compounds according to the invention are 4-(β-sulfatoethylsulfonyl)-2-aminophenol, 4-iosulfatoethylsulfonyl)-2-amino-phenol, 4-vinylsulfonyl-2-amino-phenol, 4-(β-chloroethylsulfonyl)-2-amino-phenol, 4-(β-phosphatoethylsulfonyl)-2-amino-phenol, 5-(β-sulfatoethylsulfonyl)-2-amino-phenol, 5-vinylsulfonyl-2-aminophenol, 5-(β-thiosulfatoethylsulfonyl)-2-aminophenol, 5-(β-chloroethylsulfonyl)-2-amino-phenol, 5-(β-phosphatoethylsulfonyl)-2-amino-phenol, 4-(β-sulfatoethylsulfonyl)-2-amino-phenol-6-sulfonic acid, 4-(β-thiosulfatoethylsulfonyl)-2-amino-phenol-6-sulfonic acid and 4-vinylsulfonyl-2-amino-phenol-6-sulfonic acid.

Aminonaphtholsulfonic acid compounds of the general formula (14) which can be used as starting compounds for the preparation of the compounds according to the invention are 6-amino-1-naphthol-3-sulfonic acid, 7-amino-1-naphthol-3-sulfonic acid, 6-amino-1-naphthol-2,5-disulfonic acid and 7-amino-1-naphthol-3,6-disulfonic acid.

Coupling components of the general formula (4) which can be used as starting compounds for the synthesis of the copper complex disazo compounds according to the invention are the N-acylamino compounds obtained from 1-amino-8-naphthol-3,6- or -4,6-disulfonic acid with cyanuric chloride or cyanuric bromide or with the dihalogeno-s-triazine compounds corresponding to the general formula (7), such as, for example, 2,4-dichloro-6-(4'-sulfoanilino)-1,3,5-triazine, 2,4-dichloro-6-(3'-sulfoanilino)-1,3,5-triazine, 2,4-dichloro-6-amino-1,3,5-triazine, 2,4-dichloro-6-methylamino-1,3,5-triazine, 2,4-dichloro-6-ethylamino-1,3,5-triazine, 2,4-dichloro-6-propylamino-1,3,5-triazine, 2,4-dichloro-6-isopropylamino-1,3,5-triazine, 2,4-dichloro-6-n-butylamino-1,3,5-triazine, 2,4-dichloro-6-β-methoxyethylamino-1,3,5-triazine, 2,4-dichloro-6-dimethylamino-1,3,5-triazine, 2,4-dichloro-6-diethylamino-1,3,5-triazine, 2,4-dichloro-6-(N-β-sulfoethyl-N-methylamino)-1,3,5-triazine, 2,4-dichloro-6-β-hydroxyethylamino-1,3,5-triazine, 2,4-dichloro-6-β-sulfatoethylamino-1,3,5-triazine, 2,4-dichloro-6-cyclohexylamino-1,3,5-triazine, 2,4-dichloro-6-morpholino-1,3,5-triazine, 2,4-dichloro-6-piperidino-1,3,5-triazine, 2,4-dichloro-6-piperazino-1,3,5-triazine, 2,4-dichloro-6-(N,N-di-β-hydroxyethyl)-amino-1,3,5-triazine, 2,4-dichloro-6-phenylamino-1,3,5-triazine, 2,4-dichloro-6-(N-methyl-N-phenylamino)-1,3,5-triazine, 2,4-dichloro-6-p-toluidino-1,3,5-triazine, 2,4-dichloro-6-o-toluidino- or -m-toluidino-1,3,5-triazine, 2,4-dichloro-6-xylidino-1,3,5-triazine, 2,4-dichloro-6-p-chloroanilino-1,3,5-triazine, 2,4-dichloro-6-o-chloroanilino- or -m-chloroanilino-1,3,5-triazine, 2,4-dichloro-6-o-anisidino- or -m-anisidino-1,3,5-triazine, 2,4-dichloro-6-o-phenitidino- or -m-phenetidino-1,3,5-triazine, 2,4-dichloro-6-o-carboxy-anilino- or -m-carboxyanilino-1,3,5-triazine, 2,4-dichloro-6-o-methoxy- or -m-methoxyphenoxy-1,3,5-triazine, 2,4-dichloro-6-p-anisidino-1,3,5-triazine, 2,4-dichloro-6-p-phenetidino-1,3,5-triazine, 2,4-dichloro-6-m- or -p-(β-sulfatoethylsulfonyl)-anilino-1,3,5-triazine, 2,4-dichloro-6-(2',4'- or 2',5'-disulfoanilino)-1,3,5-triazine, 2,4-dichloro-6-N-sulfomethylanilino-1,3,5-triazine, 2,4-dichloro-6-(4'-methyl-2'-sulfoanilino)-1,3,5-triazine, 2,4-dichloro-6-p-carboxyanilino-1,3,5-triazine, 2,4-dichloro-6-(2'-carboxy-4'- or -5'-sulfo)-anilino-1,3,5-triazine, 2,4-dichloro-6-(4'-sulfonaphth-1'-ylamino)-1,3,5-triazine, 2,4-dichloro-6-(3',6'-disulfonaphth-1'-ylamino)-1,3,5-triazine, 2,4-dichloro-6-(3',6',8'-trisulfonaphth-1'-ylamino)-1,3,5-triazine, 2,4-dichloro-6-methoxy-1,3,5-triazine, 2,4-dichloro-6-ethoxy-1,3,5-triazine, 2,4-dichloro-6-propoxy-1,3,5-triazine, 2,4-dichloro-6-isopropoxy-1,3,5-triazine, 2,4-dichloro-6-(β-methoxy-ethoxy)-1,3,5-triazine, 2,4-dichloro-6-(β-ethoxy-ethoxy)-1,3,5-triazine, 2,4-dichloro-6-phenoxy-1,3,5-triazine, 2,4-dichloro-6-m- or -p-chlorophenoxy-1,3,5-triazine, 2,4-dichloro-6-p-methoxyphenoxy-1,3,5-triazine, 2,4-dichloro-6-m- or -p-sulfophenoxy-1,3,5-triazine, 2,4-dichloro-6-methylmercapto-1,3,5-triazine, 2,4-dichloro-6-β-hydroxyethylmercapto-1,3,5-triazine, 2,4-dichloro-6-phenylmercapto-1,3,5-triazine and the correspond-2,4-dibromo-triazine derivatives.

Preferred copper complex disazo compounds according to the invention, corresponding to the general formula (1), are those in which Y denotes the β-thiosulfatoethyl or, in particular, the vinylsulfonyl or β-sulfatoethylsulfonyl group, and also those in which n represents the number 1, as well as those in which Z represents a chlorine atom, and furthermore those in which the one sulfo group in the terminal triazinylamino-naphtholsulfonic acid component is bonded in the meta-position relative to the acylated amino group. Other preferred compounds are those in which X is a group of the general formula (2c) in which $R^3$ represents a hydrogen atom or an alkyl group which has 1 to 4 carbon atoms and can be substituted by a hydroxy or sulfo group and in which $R^4$, which is identical to $R^3$ or different from $R^3$, denotes a hydrogen atom or an alkyl group which has 1 to 4 carbon atoms and can be substituted by a hydroxy, sulfo, sulfato, methoxy or ethoxy group, or denotes the phenyl radical, which can be substituted by one or two substituents from the group comprising sulfo, methyl, ethyl, methoxy, ethoxy, chlorine and carboxy or can be substituted by a β-sulfatoethylsulfonyl group, or denotes the naphthyl radical, which can be substituted by one, two or three sulfo groups, such as, for example, the toluidino, xylidino, chlorophenylamino, methoxy or dimethoxyphenylamino group, the ethoxyphenylamino, sulfophenylamino, 3-(β-sulfatoethylsulfonyl)-phenylamino or 4-(β-sulfatoethylsulfonyl)-phenylamino group, the disulfophenylamino group, the carboxyphenylamino group or the 2-carboxy-5-phenylamino, 2-carboxy-4-sulfophenylamino, 4-sulfonaphth-1-ylamino, 3,6-disulfonaphth-1-ylamino or 3,6,8-trisulfonaphth-1-ylamino group, or the morpholino radical.

Copper complex disazo compounds according to the invention which are furthermore to be singled out are the compounds corresponding to the general formulae (15), (16), (17) and (18)

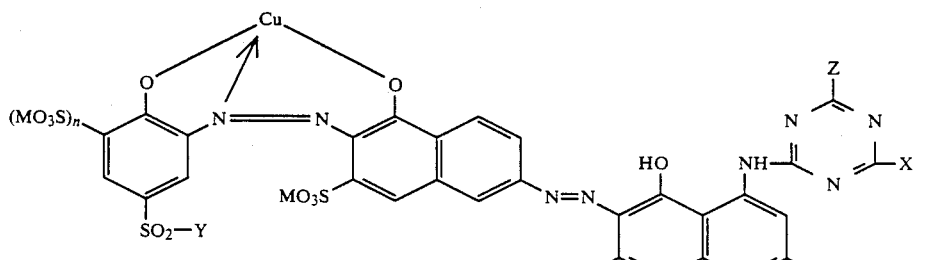

(15)

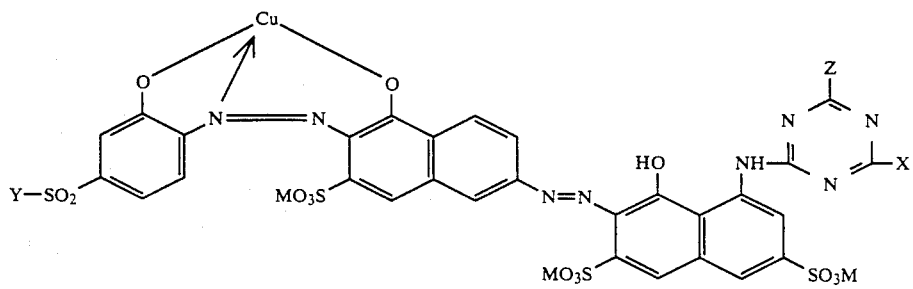

(16)

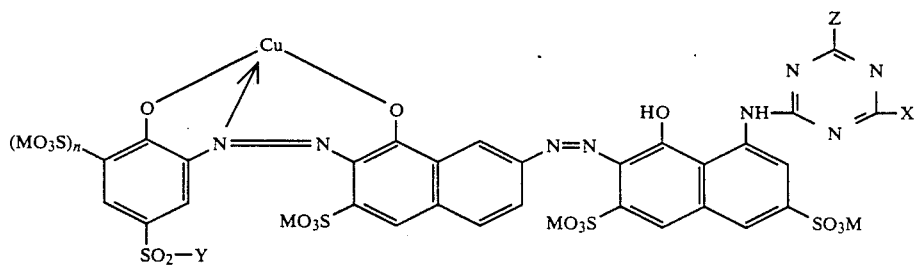

(17)

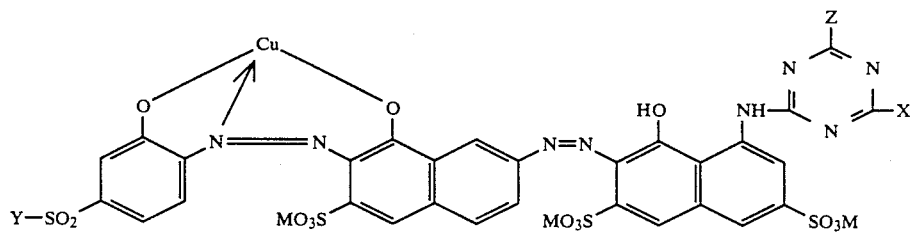

(18)

In these formulae, the formula members M, Y, n, Z and X have the abovementioned, particularly preferred, meanings.

The copper complex disazo compounds according to the invention which are described in Examples 14 to 23 may be particularly singled out as individual compounds The compounds of the general formula (1) prepared according to the invention can be separated out of and isolated from the synthesis solutions by generally known methods, thus, for example, by precipitation from the reaction medium by means of electrolytes, such as, for example, sodium chloride or potassium chloride, or by evaporation of the reaction solution, for example by spray-drying, it being possible to add a buffer substance, such as, for example, a mixture of mono- and di-sodium phosphate, to this reaction solution. If appropriate, these synthesis solutions can also be passed directly, as a liquid preparation, for use in dyeing, if necessary after addition of a buffer substance and after any necessary concentration.

The copper complex disazo compounds according to the invention have valuable dyestuff properties and, as a result of their radicals of the vinylsulfone type and the halogenotriazinyl radical, have fiber-reactive properties. The new compounds are preferably used for dyeing (in the general sense, including printing) materials containing hydroxy groups and/or carboxamide groups, for example in the form of sheet-like structures, such as paper and leather, or for dyeing polyamide films, or for bulk-dyeing, such as, for example, of polyamide and polyurethane, but also of these materials in fiber form. The present invention thus also relates to the use of the compounds of the general formula (1) for dyeing (in the above sense) these materials and to processes for dyeing such materials by procedures which are customary per se and in which a compound of the general formula (1) is used as the dyeing agent. The materials are preferably in the form of fiber materials, in particular in the form of textile fibers, such as yarns, wound packages, woven fabrics and knitted fabrics.

Materials containing hydroxy groups are naturally occurring, regenerated or synthetic materials containing hydroxy groups, such as, for example, cellulose fiber materials or regenerated cellulose materials and polyvinyl alcohols. Preferred cellulose fiber materials are cotton, as well as other vegetable fibers, such as linen, hemp, jute and ramie fibers; examples of regenerated cellulose fibers are viscose staple and filament viscose.

Examples of materials containing carboxamide groups are synthetic polyamides, such as polyamide 6,6, polyamide 6, polyamide 11 and polyamide 4, and polyurethanes, in particular in the form of fibers, or naturally occurring polyamides, for example wool and other animal hair, silk and leather.

The copper complex disazo dyestuffs according to the invention can be applied to and fixed on the above substrates, in particular on the above fiber materials, by the use techniques known for water-soluble dyestuffs, in particular for fiber-reactive dyestuffs.

Thus, very good color yields and an excellent color build-up are obtained with them on cellulose fibers by the exhaustion process using the most diverse acid-binding agents and, if necessary, with the addition of neutral salts, such as sodium chloride or sodium sulfate. Dyeing is carried out at temperatures between 40° and 105° C., if appropriate at temperatures of up to 120° C. under pressure, and if appropriate in the presence of customary dyeing auxiliaries, in an aqueous bath. The procedure followed can be to introduce the material into the warm bath, to warm this gradually to the desired dyeing temperature and to bring the dyeing process to completion at this temperature. If desired, the neutral salts which accelerate the exhaustion of the dyestuff can first be added to the bath after the actual dyeing temperature has been reached.

Excellent color yields are likewise obtained on cellulose fibers by the padding method, it being possible for the dyestuffs to be fixed in the customary manner by batching at room temperature or elevated temperature, for example up to 60° C., by steaming or by dry heat.

Deep prints with sharp contours and a clear white ground can also be obtained by the customary printing processes for cellulose fibers, which can be carried out as a one-phase process - for example by printing with a printing paste containing sodium bicarbonate or another acid-binding agent and subsequent steaming at 100°-103° C. or as a two-phase process - for example by printing with a neutral or weakly acid printing ink, subsequent fixing, either by passage through a hot alkaline bath containing electrolytes or by over-padding with an alkaline padding liquor containing electrolytes and subsequent batching or steaming or treatment of the over-padded material with dry heat. The quality of the prints is only slightly dependent on the varying fixing conditions. The degrees of fixing obtained with the compounds according to the invention are very high both in the dyeing industry and in the printing industry.

As well as customary steam at 100°-103° C., it is also possible to use superheated steam and pressurized steam at temperatures of up to 160° C. Hot air at 120° to 200° C. is used for fixing by means of dry heat by the customary thermofixing processes.

Examples of the acid-binding agents and the agents which effect fixing of the compounds according to the invention onto the cellulose fibers are water-soluble basic salts of alkali metals and also of alkaline earth metals and inorganic and organic acids or compounds which liberate alkali under the influence of heat. The alkali metal hydroxides and alkali metal salts of weak to moderately strong inorganic or organic acids may be mentioned in particular, and alkali metal compounds preferably means the sodium and potassium compounds. Examples of such acid-binding agents are sodium hydroxide, potassium hydroxide, sodium carbonate, sodium bicarbonate, potassium carbonate, sodium formate, sodium dihydrogen phosphate, disodium hydrogen phosphate, sodium trichloroacetate, waterglass and trisodium phosphate.

By treatment of the compounds according to the invention with the acid-binding agents, if necessary under the action of heat, these are chemically bonded to the cellulose fibers. In particular, after the customary after-treatment by rinsing to remove non-fixed portions, the cellulose dyeings display excellent fastness to wet processing.

In respect of the coloristic properties of the compounds according to the invention, it should be particularly emphasized that they are distinguished by a good stability in printing pastes and padding liquors, even in the presence of alkali, by a very good affinity from a long liquor, by a good color build-up when used in customary dyeing and printing processes, by the same depth of color in the dyeing of cotton and regenerated cellulose fibers, by a level appearance of the dyeings and prints produced with them, and also by a uniform quality of dyeings obtained from a long liquor with the addition of various amounts of electrolytes. Non-fixed portions of dyestuff can easily be washed out.

Polyurethane fibers and polyamide fibers are usually dyed from an acid medium. Thus, for example, acetic acid and/or ammonium sulfate or acetic acid and ammonium acetate or sodium acetate can be added to the dye-bath in order to achieve the desired pH value. It is advisable to add customary leveling agents, such as, for example, those based on a reaction product of cyanuric chloride with three times the molar amount of an aminobenzenesulfonic acid and/or an aminonaphthalenesulfonic acid or based on a reaction product of, for example, stearylamine and ethylene oxide, for the purpose of achieving a good levelness of the dyeing. As a rule, the material to be dyed is introduced into the bath, which has first been rendered weakly alkaline, at a temperature of about 40° C. and is agitated in the bath for some time, the dyebath is adjusted to a weakly acid pH value, preferably a weakly acid pH obtained with acetic acid, and the actual dyeing is carried out at a temperature between 60° and 100° C. The dyeing processes can, however, also be carried out at temperatures up to 120° C. under pressure.

The copper complex disazo compounds according to the invention are distinguished by a high degree of fixing in the dyeing and printing of fiber materials. For economic, energy and ecological reasons, this is of great advantage in practice, since the better utilization of the available dyestuff is equated with an energy-saving, easier washing out of the decreased portion of non-fixed dyestuff and a lower pollution of the effluent.

The dyeings and prints produced with the copper complex disazo compounds of the formula (1) are distinguished by clear shades. In particular, the dyeings and prints on cellulose fiber materials have, as already mentioned, a good depth of color, and moreover a good to very good fastness to light and very good wet-fastness properties, such as fastness to washing, milling, water, seawater and perspiration, and furthermore a good fastness to pleating, fastness to ironing and fastness to rubbing.

The examples which follow serve to illustrate the invention. The parts mentioned therein are parts by weight, and the percentages are percentages by weight, unless indicated otherwise. Parts by weight bear the same relation to parts by volume as that of the kilogram to the liter.

The compounds described by way of their formulae in the examples below are shown in the form of the free acids; in general, they are prepared and isolated in the form of their sodium or potassium salts, and are used for dyeing in the form of their salts. The starting compounds and components mentioned in the form of the free acid in the examples which follow, in particular in the tabular examples, can likewise be used in the synthesis as such or in the form of their salts, preferably their alkali metal salts, such as sodium or potassium salts.

EXAMPLE 1

(a) 14.9 parts of 4-β-sulfatoethylsulfonyl-2-aminophenol are suspended in a mixture of 50 parts of water and 25 parts of ice and are dissolved by addition of 3.3 parts of sodium carbonate; 10.3 parts by volume of an aqueous 5N sodium nitrite solution are added, and the entire mixture is allowed to run into a mixture of 13 parts by volume of 31% strength aqueous hydrochloric acid and 100 parts of ice, while stirring, the temperature being kept at 0° to 5° C. Stirring is continued at this temperature for 30 minutes; the pH is then adjusted to a value from 5.8 to 6.2 with sodium bicarbonate. 16 parts of 6-amino-1-naphthol-3,5-disulfonic acid are introduced, while stirring, the pH is adjusted to a value of 6.8 and the coupling reaction is continued and brought to completion over a period of a few hours at a temperature between 5° and 10° C., while maintaining the above pH value and while stirring. 11.5 parts by volume of aqueous 5N sodium nitrite solution are then added and the mixture is stirred into a mixture of 15 parts by volume of 31% strength aqueous hydrochloric acid and 300 parts of ice. Stirring is continued at 0° to 5° C. for another 60 minutes, an excess of nitrous acid is destroyed, in the customary manner, with amidosulfonic acid and the mixture is adjusted to a pH value of 6 with sodium bicarbonate.

(b) In a separate operation, the following reaction solution is prepared: 16 parts of 1-amino-8-naphthol-3,6-disulfonic acid are suspended in 150 parts of water of about 10° C., while stirring. 9.7 parts of 2,4,6-trichloro-s-triazine are stirred in at a temperature between 0° and 10° C. and the batch is stirred further for two hours at a pH value between 2 and 2.5 (which is maintained with sodium bicarbonate) and then clarified and poured into a solution of 8.65 parts of aniline-3-sulfonic acid in 75 parts of water and 25 parts by volume of aqueous 2N sodium hydroxide solution. This mixture is stirred at a temperature between 35° and 40° C. and at a pH value between 4 and 4.5 for a further six hours.

(c) The diazonium salt solution, prepared under (a), of the aminoazo compound and the solution, prepared under (b), of the two-fold condensation product are combined at a temperature of about 5° C. and the mixture is stirred further at 8° to 10° C. and at a pH value of 5.5–6.5 for several hours, until the coupling reaction has ended. 12.5 parts of crystalline copper sulfate and 8.5 parts of crystalline sodium acetate are then added, and the mixture is stirred at 25°–35° C. and at a pH value between 4.5 and 5.0 for about two hours. This solution of the disazo compound is clarified by means of 5 parts of kieselguhr and filtration and the disazo compound according to the invention is precipitated by addition of about 380 parts of potassium chloride. After the product has been filtered off, dried and ground, a blue-black powder is obtained, which contains the alkali metal salt, predominantly the potassium salt, of the copper complex disazo compound of the formula

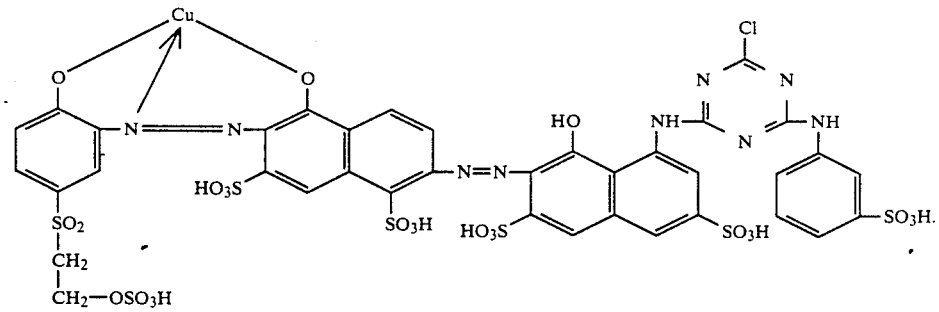

This powder has very good fiber-reactive dyestuff properties and dyes the materials mentioned in the description, such as, for example, cotton, in deep, dark-blue shades with very good fastness properties, of which fastness to light, washing, water and perspiration and fastness to chlorinated water may be particularly singled out, by the use methods customary in industry, in particular by the application and fixing processes customary for fiber-reactive dyestuffs in the dyeing industry and in printing.

EXAMPLE 2

To prepare a copper complex disazo compound according to the invention, the procedure followed is similar to the procedure in Example 1, but the solution described in Example 1b is replaced by an equivalent amount of a solution of the primary condensation product of 2,4,6-trichloro-s-triazine and 1-amino-8-naphthol-3,6-disulfonic acid.

The corresponding alkali metal salt of the compound of the formula

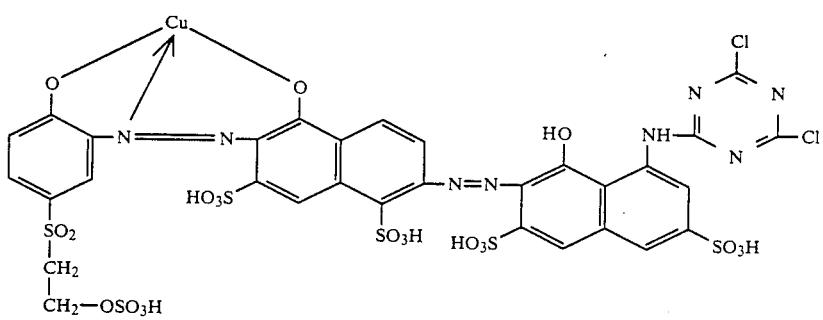

is obtained, which likewise has very good fiber-reactive dyestuff properties and, when used by the application and fixing methods customary in industry for fiber-reactive dyestuffs, gives, for example on cotton materials, reddish-tinged navy blue dyeings and prints of very good fastness properties in use and in manufacturing processes, of which the fastness to light, water, washing and perspiration can be singled out in particular.

EXAMPLES 3 TO 66

The copper complex disazo compounds according to the invention which are characterized by their starting components (an aminophenol corresponding to the general formula (10) as the diazo component, an aminonaphtholsulfonic acid corresponding to the general formula (14) as the middle component which can couple and be diazotized, and a 1-(halogenotriazinylamino)-8-naphthol-3,6- or -4,6-disulfonic acid corresponding to the general formula (4) as the terminal coupling component) in the tabular examples which follow can also be prepared in the manner according to the invention, for example in accordance with the procedure described in Example 1, by reaction of these starting compounds and subsequent coppering with a compound which donates copper. These copper complex disazo compounds according to the invention likewise have very good fiber-reactive dyestuff properties and give dyeings and prints on the fiber materials mentioned in the description, in particular on cellulose fiber materials, with very good technological properties and fastness properties and in the shade on, for example, cotton indicated in the particular tabular example, by the application and fixing methods customary for fiber-reactive dyestuffs.

These starting compounds are given in the form of the free acid; they can be used in the synthesis as such, and also in the form of their salts, preferably their alkali metal salts, such as sodium or potassium salts.

| Example | Aminophenol corresponding to formula (10) | Aminonaphtholsulfonic acid corresponding to formula (14) | Halogenotriazinylaminonaphthol corresponding to formula (4) | Shade on cotton |
|---|---|---|---|---|
| 3 | 4-β-Sulfatoethylsulfonyl-2-aminophenol | 6-Amino-1-naphthol-3-sulfonic acid | 1-(4',6'-Dichloro-s-triazin-2'-yl)-amino-3,6-disulfo-8-naphthol | dark blue |
| 4 | 5-β-Sulfatoethylsulfonyl-2-aminophenol | 6-Amino-1-naphthol-3-sulfonic acid | 1-(4',6'-Dichloro-s-triazin-2'-yl)-amino-3,6-disulfo-8-naphthol | dark blue |
| 5 | 4-β-Sulfatoethylsulfonyl-2-aminophenol-6-sulfonic acid | 6-Amino-1-naphthol-3-sulfonic acid | 1-(4',6'-Dichloro-s-triazin-2'-yl)-amino-3,6-disulfo-8-naphthol | dark blue |
| 6 | 4-Vinylsulfonyl-2-aminophenol | 6-Amino-1-naphthol-3-sulfonic acid | 1-(4',6'-Dichloro-s-triazin-2'-yl)-amino-3,6-disulfo-8-naphthol | dark blue |
| 7 | 5-Vinylsulfonyl-2-aminophenol | 6-Amino-1-naphthol-3-sulfonic acid | 1-(4',6'-Dichloro-s-triazin-2'-yl)-amino-3,6-disulfo-8-naphthol | dark blue |
| 8 | 4-Vinylsulfonyl-2-aminophenol-6-sulfonic acid | 6-Amino-1-naphthol-3-sulfonic acid | 1-(4',6'-Dichloro-s-triazin-2'-yl)-amino-3,6-disulfo-8-naphthol | dark blue |
| 9 | 4-β-Thiosulfatoethylsulfonyl-2-aminophenol | 6-Amino-1-naphthol-3-sulfonic acid | 1-(4',6'-Dichloro-s-triazin-2'-yl)-amino-3,6-disulfo-8-naphthol | dark blue |
| 10 | 5-β-Thiosulfatoethylsulfonyl-2-aminophenol | 6-Amino-1-naphthol-3-sulfonic acid | 1-(4',6'-Dichloro-s-triazin-2'-yl)-amino-3,6-disulfo-8-naphthol | dark blue |
| 11 | 4-β-Thiosulfatoethylsulfonyl-2-aminophenol-6-sulfonic acid | 6-Amino-1-naphthol-3-sulfonic acid | 1-(4',6'-Dichloro-s-triazin-2'-yl)-amino-3,6-disulfo-8-naphthol | dark blue |
| Example | Aminophenol (10) | Aminonaphthol (14) | Triazinylaminonaphthol (4) | Shade |
| 12 | 4-β-Sulfatoethylsulfonyl-2-aminophenol | 6-Amino-1-naphthol-3-sulfonic acid | 1-[4'-Chloro-6'-(3''-sulfophenylamino)-s-triazin-2'-yl]-amino-3,6-disulfo-8-naphthol | dark blue |
| 13 | 5-β-Sulfatoethylsulfonyl-2-aminophenol | 6-Amino-1-naphthol-3-sulfonic acid | 1-[4'-Chloro-6'-(3''-sulfophenylamino)-s-triazin-2'-yl]-amino-3,6-disulfo-8-naphthol | dark blue |
| 14 | 4-β-Sulfatoethyl- | 6-Amino-1-naphthol- | 1-[4'-Chloro-6'-(3''-sulfo- | dark blue |

|    | | | | -continued |
|----|---|---|---|---|
|    | sulfonyl-2-aminophenol-6-sulfonic acid | 3-sulfonic acid | phenylamino)-s-triazin-2'-yl]-amino-3,6-disulfo-8-naphthol | |
| 15 | 4-β-Sulfatoethyl-sulfonyl-2-aminophenol | 6-Amino-1-naphthol 3-sulfonic acid | 1-(4'-Chloro-6'-amino-s-triazin-2'-yl)-amino-3,6-disulfo-8-naphthol | dark blue |
| 16 | 5-β-Sulfatoethyl-sulfonyl-2-aminophenol | 6-Amino-1-naphthol 3-sulfonic acid | 1-(4'-Chloro-6'-amino-s-triazin-2'-yl)-amino-3,6-disulfo-8-naphthol | dark blue |
| 17 | 4-β-Sulfatoethyl-sulfonyl-2-aminophenol-6-sulfonic acid | 6-Amino-1-naphthol-3-sulfonic acid | 1-(4'-Chloro-6'-amino-s-triazin-2'-yl)-amino-3,6-disulfo-8-naphthol | dark blue |
| 18 | 4-β-Sulfatoethyl-sulfonyl-2-aminophenol | 6-Amino-1-naphthol-3-sulfonic acid | 1-[4'-Chloro-6'-(3''-β-sulfato-ethylsulfonyl-phenylamino)-s-triazin-2'-yl]-amino-3,6-disulfo-8-naphthol | navy blue |
| 19 | 5-β-Sulfatoethyl-sulfonyl-2-aminophenol | 6-Amino-1-naphthol-3-sulfonic acid | 1-[4'-Chloro-6'-(3''-β-sulfato-ethylsulfonyl-phenylamino)-s-triazin-2'-yl]-amino-3,6-disulfo-8-naphthol | navy blue |
| 20 | 4-β-Sulfatoethyl-sulfonyl-2-aminophenol-6-sulfonic acid | 6-Amino-1-naphthol-3-sulfonic acid | 1-[4'-Chloro-6'-(3''-β-sulfato-ethylsulfonyl-phenylamino)-s-triazin-2'-yl]-amino-3,6-disulfo-8-naphthol | navy blue |
| 21 | 4-β-Sulfatoethyl-sulfonyl-2-aminophenol | 6-Amino-1-naphthol-3-sulfonic acid | 1-[4'-Chloro-6'-(4''-β-sulfato-ethylsulfonyl-phenylamino)-s-triazin-2'-yl]-amino-3,6-disulfo-8-naphthol | navy blue |
| 22 | 5-β-Sulfatoethyl-sulfonyl-2-aminophenol | 6-Amino-1-naphthol-3-sulfonic acid | 1-[4'-Chloro-6'-(4''-β-sulfato-ethylsulfonyl-phenylamino)-s-triazin-2'-yl]-amino-3,6-disulfo-8-naphthol | navy blue |
| 23 | 4-β-Sulfatoethyl-sulfonyl-2-aminophenol-6-sulfonic acid | 6-Amino-1-naphthol-3-sulfonic acid | 1-[4'-Chloro-6'-(4''-β-sulfato-ethylsulfonyl-phenylamino)-s-triazin-2'-yl]-amino-3,6-disulfo-8-naphthol | navy blue |
| 24 | 4-β-Sulfatoethyl-sulfonyl-2-aminophenol | 6-Amino-1-naphthol-3-sulfonic acid | 1-[4'-Chloro-6'-(N-methyl-N-phenylamino)-s-triazin-2'-yl]-amino-3,6-disulfo-8-naphthol | dark blue |
| 25 | 5-β-Sulfatoethyl-sulfonyl-2-aminophenol | 6-Amino-1-naphthol-3-sulfonic acid | 1-[4'-Chloro-6'-(N-methyl-N-phenylamino)-s-triazin-2'-yl]-amino-3,6-disulfo-8-naphthol | dark blue |
| 26 | 4-β-Sulfatoethyl-sulfonyl-2-aminophenol-6-sulfonic acid | 6-Amino-1-naphthol-3-sulfonic acid | 1-[4'-Chloro-6'-(N-methyl-N-phenylamino)-s-triazin-2'-yl]-amino-3,6-disulfo-8-naphthol | dark blue |
| 27 | 4-β-Sulfatoethyl-sulfonyl-2-aminophenol | 6-Amino-1-naphthol-3-sulfonic acid | 1-[4'-Chloro-6'-(4''-sulfo-phenylamino)-triazin-2'-yl]-amino-3,6-disulfo-8-naphthol | dark blue |
| 28 | 5-β-Sulfatoethyl-sulfonyl-2-aminophenol | 6-Amino-1-naphthol-3-sulfonic acid | 1-[4'-Chloro-6'-(4''-sulfo-phenylamino)-triazin-2'-yl]-amino-3,6-disulfo-8-naphthol | dark blue |
| 29 | 4-β-Sulfatoethyl-sulfonyl-2-aminophenol-6-sulfonic acid | 6-Amino-1-naphthol-3-sulfonic acid | 1-[4'-Chloro-6'-(4''-sulfo-phenylamino)-triazin-2'-yl]-amino-3,6-disulfo-8-naphthol | dark blue |
| 30 | 4-β-Sulfatoethyl-sulfonyl-2-aminophenol | 6-Amino-1-naphthol-3-sulfonic acid | 1-(4'-Chloro-6'-ethylamino-triazin-2'-yl)-amino-3,6-di-sulfo-8-naphthol | dark blue |
| 31 | 4-β-Sulfatoethyl-sulfonyl-2-aminophenol-6-sulfonic acid | 6-Amino-1-naphthol 3-sulfonic acid | 1-(4'-Chloro-6'-ethylamino triazin-2'-yl)-amino-3,6-di-sulfo-8-naphthol | dark blue |
| 32 | 4-β-Sulfatoethyl-sulfonyl-2-aminophenol | 6-Amino-1-naphthol-3-sulfonic acid | 1-[4'-Chloro-6'-(N-methyl-N-β-sulfatoethylamino)-triazin-2'-yl]-amino-3,6-disulfo-8-naphthol | dark blue |
| 33 | 5-β-Sulfatoethyl-sulfonyl-2-aminophenol | 6-Amino-1-naphthol-3-sulfonic acid | 1-[4'-Chloro-6'-(N-methyl-N-β-sulfatoethylamino)-triazin-2'-yl]-amino-3,6-disulfo-8-naphthol | dark blue |
| 34 | 4-β-Sulfatoethyl-sulfonyl-2-aminophenol-6-sulfonic acid | 6-Amino-1-naphthol-3-sulfonic acid | 1-[4'-Chloro-6'-(N-methyl-N-β-sulfatoethylamino)-triazin-2'-yl]-amino-3,6-disulfo-8-naphthol | dark blue |
| 35 | 4-β-Sulfatoethyl-sulfonyl-2-aminophenol | 6-Amino-1-naphthol-3-sulfonic acid | 1-[4'-Chloro-6'-(β-sulfo-ethyl)-aminotriazin-2'-yl]-amino-3,6-disulfo-8-naphthol | dark blue |
| 36 | 5-β-Sulfatoethyl-sulfonyl-2-aminophenol | 6-Amino-1-naphthol-3-sulfonic acid | 1-[4'-Chloro-6'-(β-sulfo-ethyl)-aminotriazin-2'-yl]-amino-3,6-disulfo-8-naphthol | dark blue |
| 37 | 4-β-Sulfatoethyl-sulfonyl-2-aminophenol-6-sulfonic acid | 6-Amino-1-naphthol-3-sulfonic acid | 1-[4'-Chloro-6'-(β-sulfo-ethyl)-aminotriazin-2'-yl]-amino-3,6-disulfo-8-naphthol | dark blue |
| 38 | 4-β-Sulfatoethyl-sulfonyl-2-aminophenol | 6-Amino-1-naphthol 3-sulfonic acid | 1-(4',6'-Dibromo-triazin-2'-yl)-amino-3,6-disulfo-8- | blue |

-continued

| | | | | |
|---|---|---|---|---|
| 39 | 4-β-Sulfatoethyl-sulfonyl-2-aminophenol | 6-Amino-1-naphthol-3-sulfonic acid | 1-[4'-Bromo-6'-(N-methyl-N-β-sulfoethyl-amino)-triazin-2'-yl]-amino-3,6-disulfo-8-naphthol | dark blue |
| 40 | 4-β-Sulfatoethyl sulfonyl-2-aminophenol | 6-Amino-1-naphthol-3-sulfonic acid | 1-(4'-Chloro-6'-β-sulfatoethyl-amino-triazin-2'-yl)-amino-3,6-disulfo-8-naphthol | dark blue |
| 41 | 5-β-Sulfatoethyl-sulfonyl-2-aminophenol | 6-Amino-1-naphthol-3-sulfonic acid | 1-(4'-Chloro-6'-β-sulfatoethyl-amino-triazin-2'-yl)-amino-3,6-disulfo-8-naphthol | dark blue |
| 42 | 4-β-Sulfatoethyl-sulfonyl-2-aminophenol-6-sulfonic acid | 6-Amino-1-naphthol-3-sulfonic acid | 1-(4'-Chloro-6'-β-sulfatoethyl-amino-triazin-2'-yl)-amino-3,6-disulfo-8-naphthol | dark blue |
| 43 | 4-β-Sulfatoethyl-sulfonyl-2-aminophenol | 6-Amino-1-naphthol-3-sulfonic acid | 1-[4'-Chloro-6'-(3''-methyl-phenylamino)-triazin-2'-yl]-amino-3,6-disulfo-8-naphthol | dark blue |
| 44 | 5-β-Sulfatoethyl-sulfonyl-2-aminophenol | 6-Amino-1-naphthol-3-sulfonic acid | 1-[4'-Chloro-6'-(3''-methyl-phenylamino)-triazin-2'-yl]-amino-3,6-disulfo-8-naphthol | dark blue |
| 45 | 4-β-Sulfatoethyl-sulfonyl-2-aminophenol-6-sulfonic acid | 6-Amino-1-naphthol-3-sulfonic acid | 1-[4'-Chloro-6'-(3''-methyl-phenylamino)-triazin-2'-yl]-amino-3,6-disulfo-8-naphthol | dark blue |
| 46 | 4-β-Sulfatoethyl-sulfonyl-2-aminophenol-6-sulfonic acid | 7-Amino-1-naphthol-3-sulfonic acid | 1-[4'-Chloro-6'-(3''-methyl-phenylamino)-triazin-2'-yl]-amino-3,6-disulfo-8-naphthol | reddish-tinged blue |
| 47 | 4-β-Sulfatoethyl-sulfonyl-2-aminophenol-6-sulfonic acid | 7-Amino-1-naphthol-3-sulfonic acid | 1-[4'-Chloro-6'-(3''-sulfo-phenylamino)-triazin-2'-yl]-amino-3,6-disulfo-8-naphthol | reddish-tinged blue |
| 48 | 4-β-Sulfatoethyl-sulfonyl-2-aminophenol | 7-Amino-1-naphthol-3-sulfonic acid | 1-[4'-Chloro-6'-(3''-sulfo-phenylamino)-triazin-2'-yl]-amino-3,6-disulfo-8-naphthol | reddish-tinged blue |
| 49 | 5-β-Sulfatoethyl-sulfonyl-2-aminophenol | 7-Amino-1-naphthol-3-sulfonic acid | 1-[4'-Chloro-6'-(3''-sulfo-phenylamino)-triazin-2'-yl]-amino-3,6-disulfo-8-naphthol | reddish-tinged blue |
| 50 | 5-β-Sulfatoethyl-sulfonyl-2-aminophenol | 7-Amino-1-naphthol-3,6-disulfonic acid | 1-[4'-Chloro-6'-(3''-sulfo-phenylamino)-triazin-2'-yl]-amino-3,6-disulfo-8-naphthol | blue |
| 51 | 4-β-Sulfatoethyl-sulfonyl-2-aminophenol | 7-Amino-1-naphthol-3,6-disulfonic acid | 1-[4'-Chloro-6'-(3''-sulfo-phenylamino)-triazin-2'-yl]-amino-3,6-disulfo-8-naphthol | blue |
| 52 | 4-β-Sulfatoethyl-sulfonyl-2-aminophenol-6-sulfonic acid | 7-Amino-1-naphthol-3,6-disulfonic acid | 1-[4'-Chloro-6'-(3''-sulfo-phenlyamino)-triazin-2'-yl]-amino-3,6-disulf0-8-naphthol | blue |
| 53 | 5-β-Sulfatoethyl-sulfonyl-2-aminophenol | 6-Amino-1-naphthol-3,5-disulfonic acid | 1-[4'-Chloro-6'-(3''-sulfo-phenylamino)-triazin-2'-yl]-amino-3,6-disulfo-8-naphthol | dark blue |
| 54 | 4-β-Sulfatoethyl-sulfonyl-2-aminophenol-6-sulfonic acid | 6-Amino-1-naphthol-3,5-disulfonic acid | 1-[4'-Chloro-6'-(3''-sulfo-phenylamino)-triazin-2' -yl]-amino-3,6-disulfo-8-naphthol | dark blue |
| 55 | 4-β-Sulfatoethyl-sulfonyl-2-aminophenol-6-sulfonic acid | 6-Amino-1-naphthol-3,5-disulfonic acid | 1-[4'-Chloro-6'-(N-methyl-N-phenylamino)-triazin-2'-yl]-amino-3,6-disulfo-8-naphthol | dark blue |
| 56 | 5-β-Sulfatoethyl-sulfonyl-2-aminophenol | 6-Amino-1-naphthol-3,5-disulfonic acid | 1-[4'-Chloro-6'-(N-methyl-N-phenylamino)-triazin-2'-yl]-amino-3,6-disulfo-8-naphthol | dark blue |
| 57 | 4-β-Sulfatoethyl-sulfonyl-2-aminophenol | 6-Amino-1-naphthol-3,5-disulfonic acid | 1-[4'-Chloro-6'-(N-methyl-N-phenylamino)-triazin-2'-yl]-amino-3,6-disulfo-8-naphthol | dark blue |
| 58 | 4-β-Sulfatoethyl-sulfonyl-2-aminophenol | 6-Amino-1-naphthol-3,5-disulfonic acid | 1-(4'-Chloro-6'-amino-triazin-2'-yl)-amino-3,6-disulfo-8-naphthol | dark blue |
| 59 | 5-β-Sulfatoethyl-sulfonyl-2-aminophenol | 6-Amino-1-naphthol-3,5-disulfonic acid | 1-(4'-Chloro-6'-amino-triazin-2'-yl)-amino-3,6-disulfo-8-naphthol | dark blue |
| 60 | 4-β-Sulfatoethyl-sulfonyl-2-aminophenol-6-sulfonic acid | 6-Amino-1-naphthol-3,5-disulfonic acid | 1-(4'-Chloro-6'-amino-triazin-2'-yl)-amino-3,6-disulfo-8-naphthol | dark blue |
| 61 | 4-β-Sulfatoethyl-sulfonyl-2-aminophenol-6-sulfonic acid | 6-Amino-1-naphthol-3-sulfonic acid | 1-[4'-Chloro-6'-(3''-sulfo-phenylamino)-triazin-2'-yl]-amino-4,6-disulfo-8-naphthol | dark blue |
| 62 | 5-β-Sulfatoethyl-sulfonyl-2-aminophenol | 6-Amino-1-naphthol-3-sulfonic acid | 1-[4'-Chloro-6'-(3''-sulfo-phenylamino)-triazin-2'-yl]-amino-4,6-disulfo-8-naphthol | dark blue |
| 63 | 4-β-Sulfatoethyl-sulfonyl-2-aminophenol | 6-Amino-1-naphthol-3-sulfonic acid | 1-[4'-Chloro-6'-(3''-sulfo-phenylamino)-triazin-2'-yl]-amino-4,6-disulfo-8-naphthol | dark blue |
| 64 | 4-β-Sulfatoethyl-sulfonyl-2-aminophenol | 6-Amino-1-naphthol-3-sulfonic acid | 1-(4'-Chloro-6'-amino-triazin-2'-yl)-amino-4,6-disulfo-8-naphthol | dark blue |
| 65 | 5-β-Sulfatoethyl-sulfonyl-2-aminophenol | 6-Amino-1-naphthol-3-sulfonic acid | 1-(4'-Chloro-6'-amino-triazin-2'-yl)-amino-4,6- | dark blue |

| | -continued | | | |
|---|---|---|---|---|
| 66 | 4-β-Sulfatoethyl-sulfonyl-2-aminophenol-6-sulfonic acid | 6-Amino-1-naphthol-3-sulfonic acid | disulfonic-8-naphthol 1-(4'-Chloro-6'-amino-triazin-2'-yl)-amino-4,6-disulfo-8-naphthol | dark blue |

EXAMPLE 67

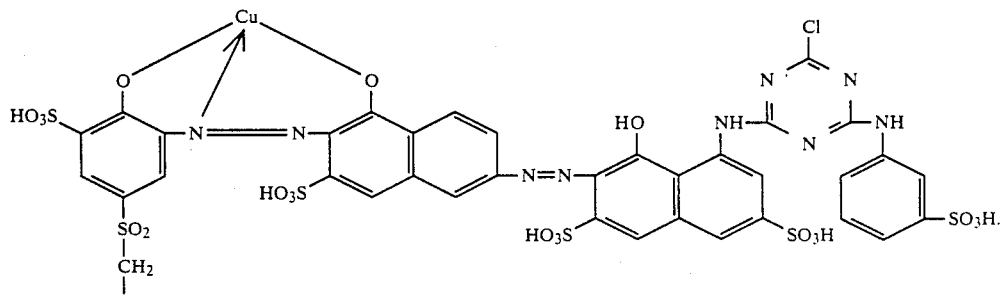

(a) A mixture of a solution of 68.9 parts of the copper complex compound of 1-hydroxy-6-amino-2-[(2'-hydroxy-5'-β-sulfatoethylsulfonyl-phenyl)-azo]-naphthalene-3,3'-disulfonic acid in 350 parts of water and 22 parts by volume of aqueous 5 N sodium nitrite solution at a temperature of 5° to 10° C. is allowed to run into a mixture of 30 parts by volume of 31% strength hydrochloric acid and 500 parts of ice, while stirring; during this, the temperature is kept at 5° to 10° C. Stirring is continued at this temperature for a further 60 minutes, and excess nitrous acid is then destroyed, in the customary manner, with a little amidosulfonic acid. The mixture is adjusted to a pH value of 5.9 to 6.1 by means of sodium bicarbonate.

(b) In a separate operation, the solution, described in Example 1 (b), of the secondary condensation product of 1-amino-8-naphthol-3,6-disulfonic acid, cyanuric chloride and aniline-3-sulfonic acid is prepared in a duplicate batch.

(c) The solution, prepared here under (a), of the diazonium salt of the copper complex azo compound and the solution, prepared under (b), of the secondary condensation product are combined at a temperature of 5° to 10° C. The reaction mixture is stirred further at a pH of 5.8 to 6.3 and at a temperature between 8° and 10° C. for several hours more, until the coupling reaction has ended. 10 parts of kieselguhr are then added, the solution is filtered at 55° to 60° C. and the compound according to the invention is precipitated from the filtrate by means of potassium chloride, filtered off, dried and ground. A black powder is obtained which, in addition to electrolyte salts, contains the alkali metal salt, predominantly the potassium salt, of the compound of the formula The powder has very good dyestuff properties and, when used in the use and fixing methods customary in industry for dyestuffs, in particular fiber-reactive dyestuffs, gives, on the materials mentioned in the description, in particular on cellulose fiber materials, such as cotton, deep dark-blue dyeings and prints with very good fastness properties, of which the fastness to light, washing, water, perspiration, rubbing, ironing and solvents can be singled out in particular.

This copper complex disazo compound according to the invention is identical to the compound according to the invention described in Example 14. The copper complex monoazo compound used as the starting compound and initially mentioned under (a) can be prepared by the procedure described in German Patent Specification No. 2,049,664.

EXAMPLE 68

(a) 93.8 parts of the copper complex disazo compound of the formula

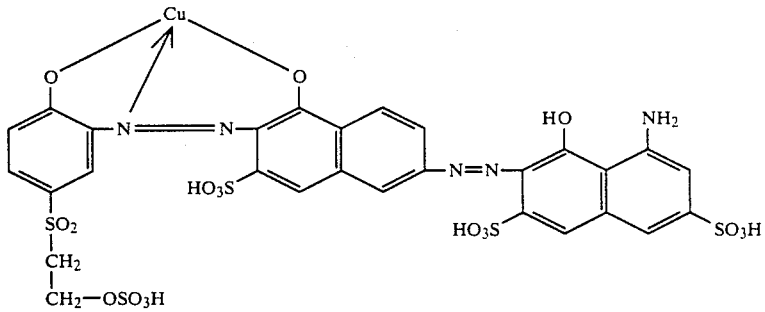

(which can be prepared by a procedure analogous to that in Example 1 of German Auslegeschrift No. 1,644,155, 31.9 parts of 1-amino-8-naphthol-3,6-disulfonic acid being used instead of the 39.7 parts of 1-acetylamino-8-naphthol-3,6-disulfonic acid), in the form of its sodium or potassium salt are dissolved in 1,000 parts of water at 50° C. The solution is adjusted to a pH value of 3.0 to 3.5 and is then cooled to 5° to 10° C. A solution of 19.5 parts of cyanuric chloride in 100 parts by volume of acetone is slowly added, while the pH value is kept constant by means of sodium bicarbonate.

(b) When the condensation reaction has ended, the solution is adjusted to a pH value of 5.5 with disodium hydrogen phosphate and spray-dried.

some hours. The compound according to the invention is then isolated by spray-drying.

A black powder is obtained which, in addition to electrolyte salts, contains the alkali metal salt, such as the sodium salt, of the compound of the formula

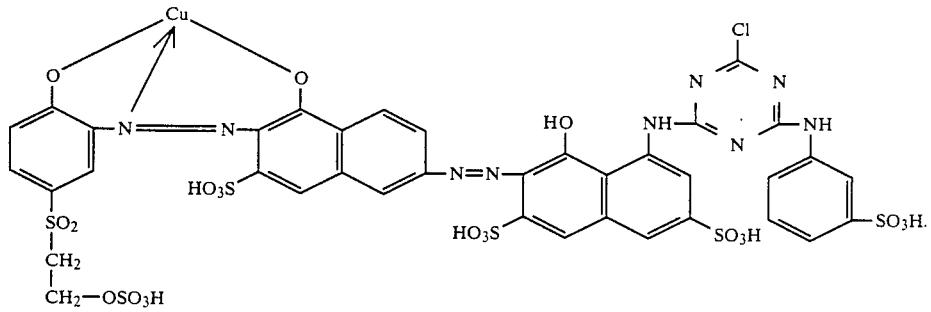

A black powder is obtained which, in addition to electrolyte salts, contains the alkali metal salt, such as the sodium salt, of the compound of the formula This compound according to the invention also has very good fiber-reactive dyestuff properties and, on the materials mentioned in the description, such as, in par-

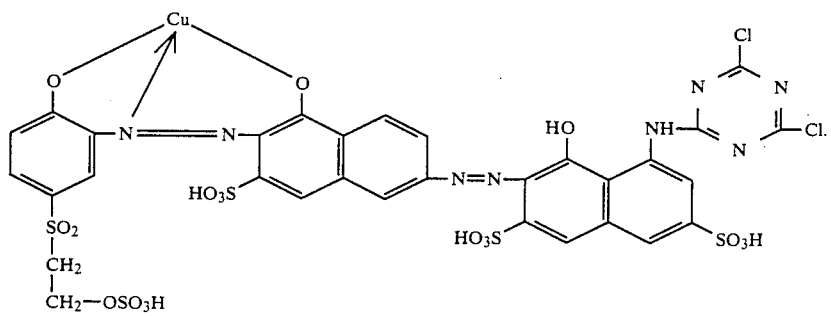

This powder has very good fiber-reactive dyestuff properties and, on the fiber materials mentioned in the description, such as, in particular, cellulose fiber materials, gives deep dark-blue dyeings and prints, which have very good fastness properties, such as, in particular, fastness to light, washing, water, solvents, rubbing and ironing, by the dyeing and printing processes customary for reactive dyestuffs in industry.

This copper complex disazo compound according to the invention is identical to the compound according to the invention in Example 3.

EXAMPLE 69

To prepare a copper complex disazo compound according to the invention, the procedure of Example 68 (a) is followed, and, when the condensation reaction has ended, 17.3 parts of aniline-3-sulfonic acid are added and the second condensation reaction is continued at a temperature of 50° C. and a pH value of 5.5 to 6.0 for ticular, cellulose fiber materials, gives deep dark-blue dyeings and prints with very good fastness properties, such as, in particular, a very good fastness to light, washing, water, solvents and rubbing, by the printing and dyeing processes customary for fiber-reactive dyestuffs in industry.

This copper complex disazo compound according to the invention is identical to the compound according to the invention in Example 12.

EXAMPLE 70

To prepare a copper complex disazo compound according to the invention, the procedure of Example 68 is followed but, instead of the copper complex disazo compound with the β-sulfatoethylsulfonyl group used therein, 95.4 parts of the corresponding β-thiosulfatoethyl compound, which can be prepared in accordance with the procedure described in Example 8 of German Offenlegungsschrift No. 1,544,541, are used as the starting compound. The alkali metal salt, such as the sodium salt, of the compound of the formula

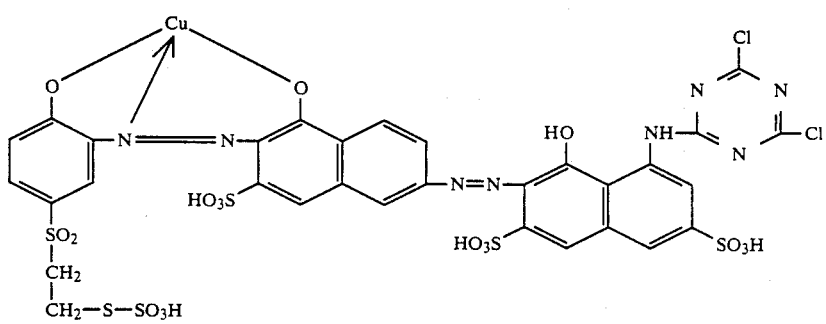

is obtained. This product likewise has very good fiber-reactive dyestuff properties and gives deep dark-blue dyeings and prints with the good fastness properties described for the dyestuff from Example 68 by the dyeing procedures customary in industry.

This thiosulfatoethylsulfonyl compound according to the invention is identical to the compound according to the invention in Example 9.

EXAMPLE 71

The primary condensation product of 18.4 parts of cyanuric chloride and 17.3 parts of aniline-3-sulfonic acid is added to a solution of 87.7 parts of the metal-free disazo compound of the formula

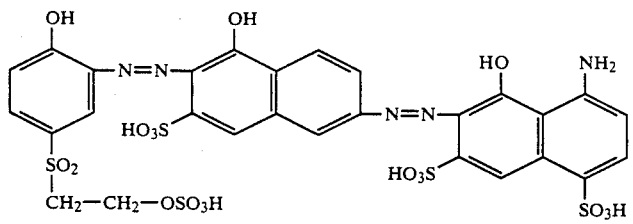

(which can be prepared by a procedure analogous to that in Example 1(a)-(c) of German Offenlegungsschrift No. 1,544,541, 50 parts of 1-amino-8-naphthol-4,6-disulfonic acid being used instead of the 50 parts of 1-amino-8-naphthol-2,4-disulfonic acid) in 900 parts of water at a pH value of 6 to 6.5 and at a temperature between 50° and 55° C.

The reaction is continued at the above pH value and at the above temperature until the condensation has ended. 25 parts of crystalline copper sulfate and 20 parts of crystalline sodium acetate are then added and the pH value is kept at 5.5 to 6.5 for another hour. The copper complex disazo compound according to the invention is then salted out by means of sodium chloride. Written in the form of the free acid, it has the formula description, such as, in particular, cellulose fiber materials, deep dark-blue dyeings and prints with very good fastness properties by the use methods customary in industry.

It is identical to the compound according to the invention in Example 63.

EXAMPLE 72

80.2 parts of a monoazo compound which is obtained by alkaline coupling of diazotized 6-amino-1-naphthol-3-sulfonic acid with 1-amino-8-naphthol-3,6-disulfonic acid is dissolved in the form of its trisodium salt in 900 parts of water at 50° to 60° C. The solution is adjusted to a pH value of 5.5 to 6.0. The primary condensation product of 18.4 parts of cyanuric chloride and 17.3 parts of aniline-3-sulfonic acid is added and the reaction to give the secondary condensation product is continued at this pH value (with addition of sodium bicarbonate) and at this temperature. When the reaction has ended, ice is added to this mixture until a temperature of 15° to 20° C. is obtained. A diazonium salt solution obtained in the customary manner from 29.7 parts of 5-β-sulfatoethylsulfonyl-2-aminophenol by diazotization in acid solution and subsequent neutralization is then added, and the coupling reaction is carried out at a pH value of 6.0 to 6.5 and at about 20° C. When the coupling has ended, the mixture is adjusted to a pH value of 5.1 with a little acetic acid; 25 parts of crystalline copper sulfate and 25 parts of crystalline sodium acetate are added.

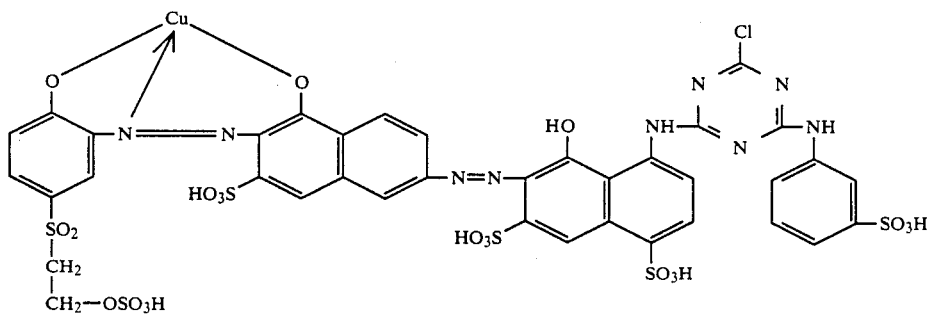

and, because of its very good fiber-reactive dyestuff properties, gives, on the fiber materials mentioned in the Stirring is continued at 35° to 40° C. for about 4 hours, and the copper complex disazo compound according to the invention is precipitated with sodium chloride, filtered off with suction, dried and ground. A black powder which contains electrolytes and the sodium salt of the compound of the formula

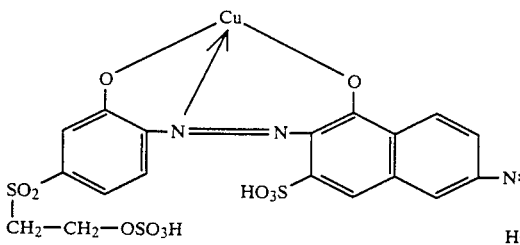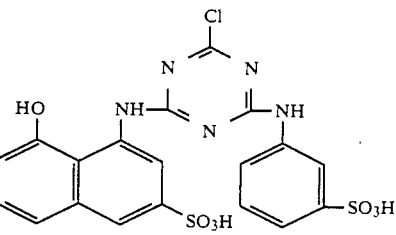

is obtained. This powder likewise has very good fiber-reactive dyestuff properties and gives deep dark-blue dyeings and prints with good fastness properties in accordance with the use and fixing methods given in the description. This copper complex disazo compound according to the invention is identical to the compound according to the invention in Example 13.

We claim:
1. A water-soluble copper complex disazo compound of the formula

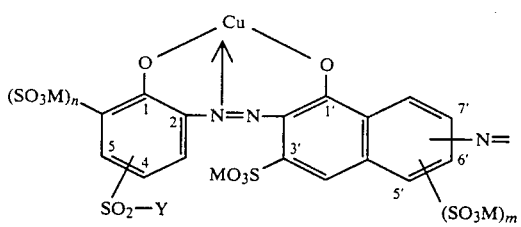

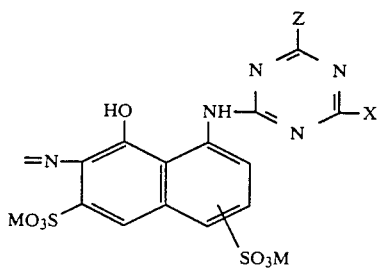

in which
  m is zero or 1 (and if m is zero, this group means hydrogen);
  n is zero or 1 (and if n is zero, this group means hydrogen);
  the group —$SO_2$—Y is bonded to the 5-position of the benzene nucleus if n is zero, or is bonded in the 4-position of the benzene nucleus if n is zero or 1;
  the free azo group is bonded to the 6'- or 7'-position of the middle naphthalene nucleus;
  if m is 1, this sulfo group is boned to the 5'-position if the azo group is in the 6'-position, and is bonded to the 6'-position if the azo group is in the 7'-position;
  X is an amino group of the formula $-N\begin{smallmatrix}R^3\\R^4\end{smallmatrix}$ in which $R^3$ is hydrogen or alkyl of 1 to 4 carbon atoms or alkyl of 1 to 4 carbon atoms substituted by hydroxy or sulfo, and $R^4$, identical to or different from $R^3$, is hydrogen or alkyl of 1 to 4 carbon atoms or alkyl of 1 to 4 carbon atoms substituted by hydroxy, sulfo, methoxy or ethoxy, or is phenyl unsubstituted or substituted by one or two substituents selected from the group consisting of sulfo, methyl, ethyl methoxy, ethoxy, chlorine and carboxy or by β-sulfatoethylsulfonyl, is naphthyl unsubstituted or substituted by one, two or three sulfo groups, or $R^3$ and $R^4$ together with the nitrogen atom are morpholino,
  Y is vinyl or a group of the formula

—$CH_2$—$CH_2$—R in which
  R is chlorine, acetoxy, phosphato, thiosulfato or sulfato;
  Z is chlorine;
  M is hydrogen or an alkali metal.

2. A copper complex disazo compound according to claim 1, of the formula

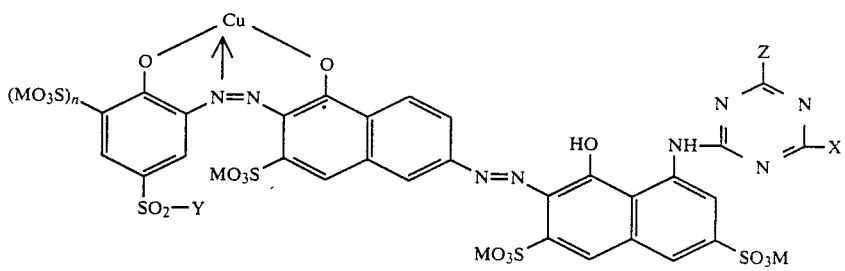

3. A copper complex disazo compound according to claim 25, of the formula

4. A copper complex disazo compound according to claim 1, of the formula

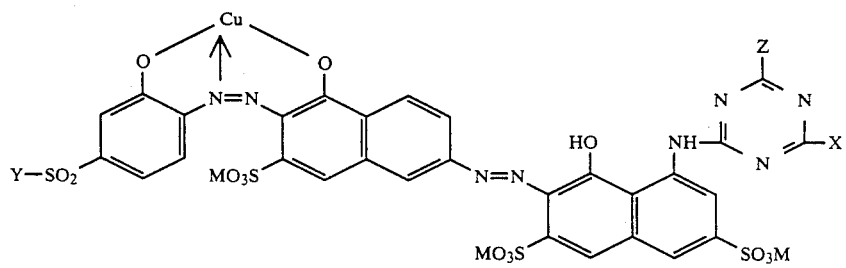

5. A copper complex disazo compound according to claim 1, of the formula

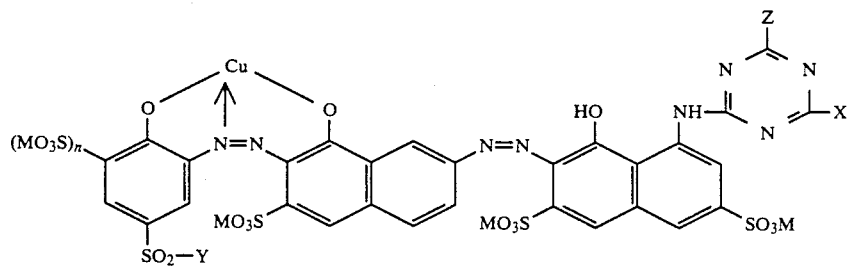

6. A compound according to claim 1, in which Y is β-sulfatoethyl or vinyl.

7. A compound according to claim 1, in which n is 1.

8. A copper complex disazo compound of the formula

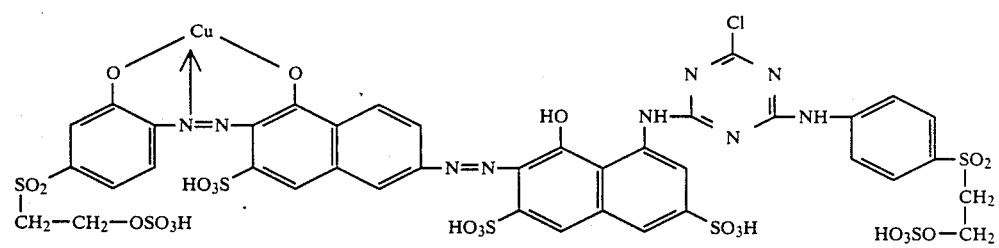

an alkali metal salt thereof.

9. A copper complex disazo compound of the formula

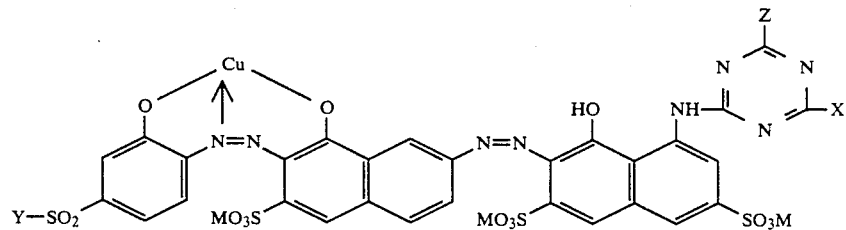

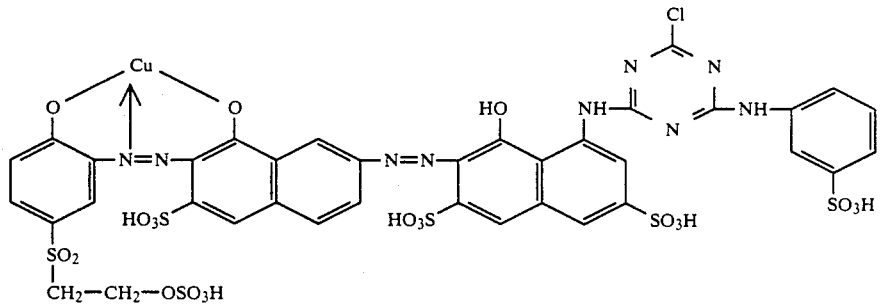

or an alkali metal salt thereof.

10. A copper complex disazo compound of the formula
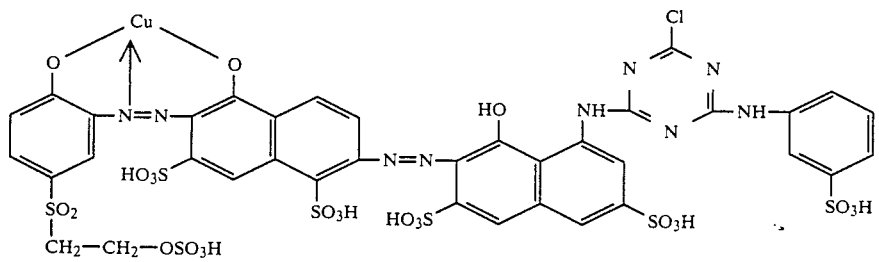
or an alkali metal salt thereof.
11. A copper complex disazo compound of the formula
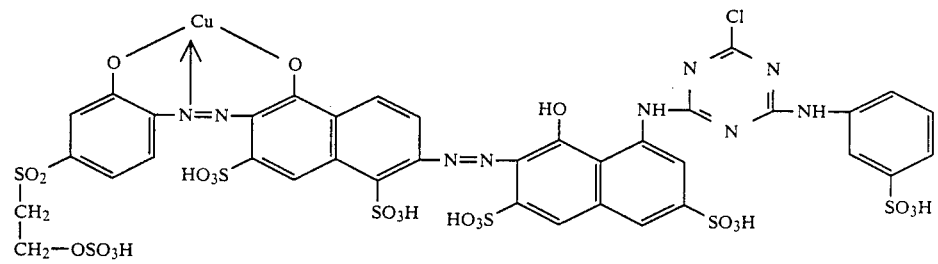
or an alkali metal salt thereof.

UNITED STATES PATENT AND TRADEMARK OFFICE
CERTIFICATE OF CORRECTION

PATENT NO. : 4,939,243
DATED : July 3, 1990
INVENTOR(S) : FRITZ MEININGER, ET AL.

It is certified that error appears in the above-identified patent and that said Letters Patent is hereby corrected as shown below:

ON THE TITLE PAGE:

Item [75] Inventors: please insert
-- Rudolf Fass of Kelkheim, Fed. Rep. of Germany -- .

In Claim 1, Column 30, Line 20, "boned" should read
-- bonded -- .

In Claim 1, Column 30, Line 40, please insert
-- or -- before "is" .

Signed and Sealed this

Fourteenth Day of January, 1992

*Attest:*

HARRY F. MANBECK, JR.

*Attesting Officer*     *Commissioner of Patents and Trademarks*